United States Patent
Chuang et al.

(10) Patent No.: US 9,055,206 B1
(45) Date of Patent: Jun. 9, 2015

(54) ELECTRONIC DEVICE

(71) Applicant: HTC Corporation, Taoyuan County (TW)

(72) Inventors: I-Cheng Chuang, Taoyuan County (TW); Hung-Wen Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 75 days.

(21) Appl. No.: 14/080,804

(22) Filed: Nov. 15, 2013

(51) Int. Cl.
  *H04N 5/225* (2006.01)
  *G02F 1/1333* (2006.01)

(52) U.S. Cl.
  CPC ........ *H04N 5/2252* (2013.01); *G02F 1/133308* (2013.01); *H04N 5/2254* (2013.01)

(58) Field of Classification Search
  CPC . H04N 5/2252; H04N 5/2253; H04N 5/2254; G02F 2007/145
  USPC .......................................... 348/343, 374, 376
  See application file for complete search history.

(56) References Cited

U.S. PATENT DOCUMENTS

| | | | |
|---|---|---|---|
| 8,944,614 B2 * | 2/2015 | Parrill | 359/511 |
| 2010/0110282 A1 * | 5/2010 | Lan et al. | 348/374 |
| 2011/0050986 A1 * | 3/2011 | Wang | 348/371 |
| 2013/0051785 A1 * | 2/2013 | Pope et al. | 396/535 |
| 2013/0265470 A1 * | 10/2013 | Liu et al. | 348/294 |
| 2014/0240911 A1 * | 8/2014 | Cole et al. | 361/679.3 |
| 2015/0065046 A1 * | 3/2015 | Wilfred et al. | 455/41.2 |

* cited by examiner

*Primary Examiner* — Nhan T Tran
(74) *Attorney, Agent, or Firm* — Jianq Chyun IP Office

(57) ABSTRACT

An electronic device including a housing, a support member, and a camera module is provided. The housing has a bump. The bump extends toward the outside of the electronic device and correspondingly forms a recess on the inside of the housing. The support member includes a chassis and a holder. The chassis is disposed inside the housing. The holder includes a body, an accommodation recess located on the body and facing the recess, and a skirt extending outwardly from a side of the accommodation recess. The holder is supported against the chassis through the skirt. The camera module is disposed inside the accommodation recess, and a portion of the camera module protrudes outside the accommodation recess, wherein the protruding portion is located in the recess, and the support member is located outside the recess, such that a sidewall of the recess faces and surrounds the camera module.

10 Claims, 1 Drawing Sheet

ELECTRONIC DEVICE

BACKGROUND OF THE INVENTION

1. Field of the Invention

The present application relates to an electronic device. More particularly, the present application relates to an electronic device having a camera module.

2. Description of Related Art

In recent years, as the technology industry becomes increasingly developed, electronic devices such as smart phones, tablet computers, and notebook computers have become popular in everyday life. The types and user functions of the electronic devices have become increasingly diverse, and convenience and practicality allow the electronic devices to be more prevalent and be used in different applications.

In addition to the built-in functions of the electronic devices, electronic devices generally are used in conjunction with additional functional components so as to have additional user functions. For instance, a camera module can be disposed within an electronic device, wherein the housing has an opening corresponding to the camera module, such that the camera module located inside the housing can capture an image located outside the housing through the opening. The camera module is generally disposed on the back or the front of the electronic device. If the camera module is disposed on the back of the electronic device and the location of the camera module and the location of the liquid crystal display overlap, then the dimension of the camera module affects the overall thickness of the electronic device.

SUMMARY OF THE INVENTION

The present application provides an electronic device having less thickness.

The electronic device of the present application includes a housing, a transparent cover, a support member, and a camera module. The housing has a bump and an opening. The bump extends toward the outside of the electronic device, and correspondingly forms a recess on the inside of the housing. The opening is located on the bump and connected to the recess. The transparent cover is disposed on the opening. The support member is disposed inside the housing, wherein the support member includes a chassis and a holder. The chassis is disposed inside the housing. The holder includes a body, an accommodation recess, and a skirt. The accommodation recess is located on the body and faces the recess, and the skirt extends toward the outside of the accommodation recess from a side of the accommodation recess. The holder is supported against the chassis through the skirt. The camera module is disposed inside the accommodation recess, wherein a portion of the camera module protrudes outside the accommodation recess, the portion of the camera module protruding outside the accommodation recess is located inside the recess and corresponds to the transparent cover, and the support member is located outside the recess, such that a sidewall of the recess faces and surrounds the camera module.

Based on the above, the electronic device of the present application has a camera module located inside a housing, and the camera module is disposed inside an accommodation recess of a support member. In particular, the outside of the housing has a bump corresponding to the camera module, the bump correspondingly forms a recess on the inside of the housing, a portion of the camera module protrudes outside the accommodation recess and is located inside the recess, and the support member is located outside the recess, such that a sidewall of the recess faces and surrounds the camera module.

In other words, the recess corresponding to the bump only wraps a portion of the camera module and does not wrap the support member used for bearing the camera module. Accordingly, the width of the recess of the present application is reduced to be close to the width of the camera module, the width of the bump is correspondingly reduced at the same time, and the thickness of each of the other regions of the electronic device is reduced.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the present application, and are incorporated in and constitute a part of this specification. The drawings illustrate embodiments of the present application and, together with the description, serve to explain the principles of the present application.

DESCRIPTION OF THE EMBODIMENTS

Figure 1:
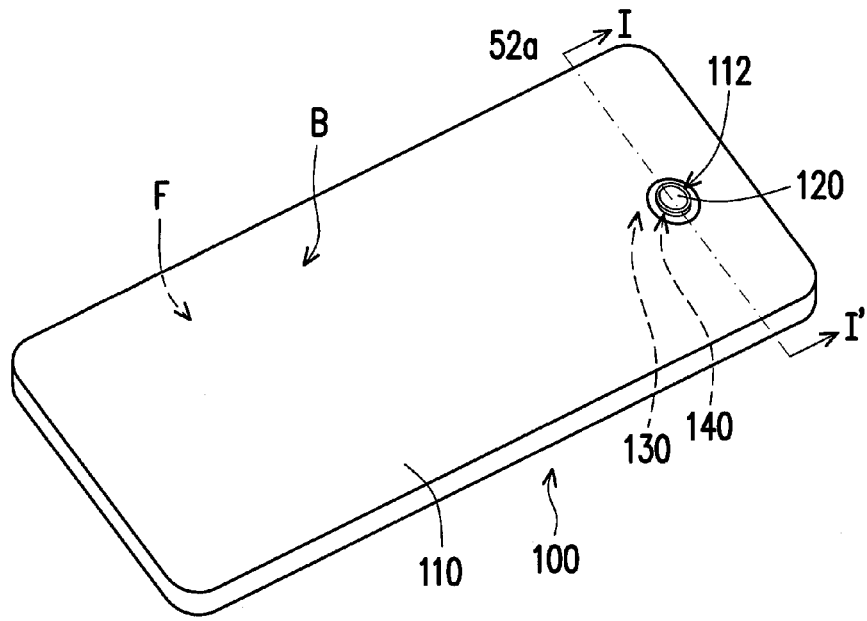
FIG. 1 is a schematic view of an electronic device according to an embodiment of the present invention.
Figure 2:
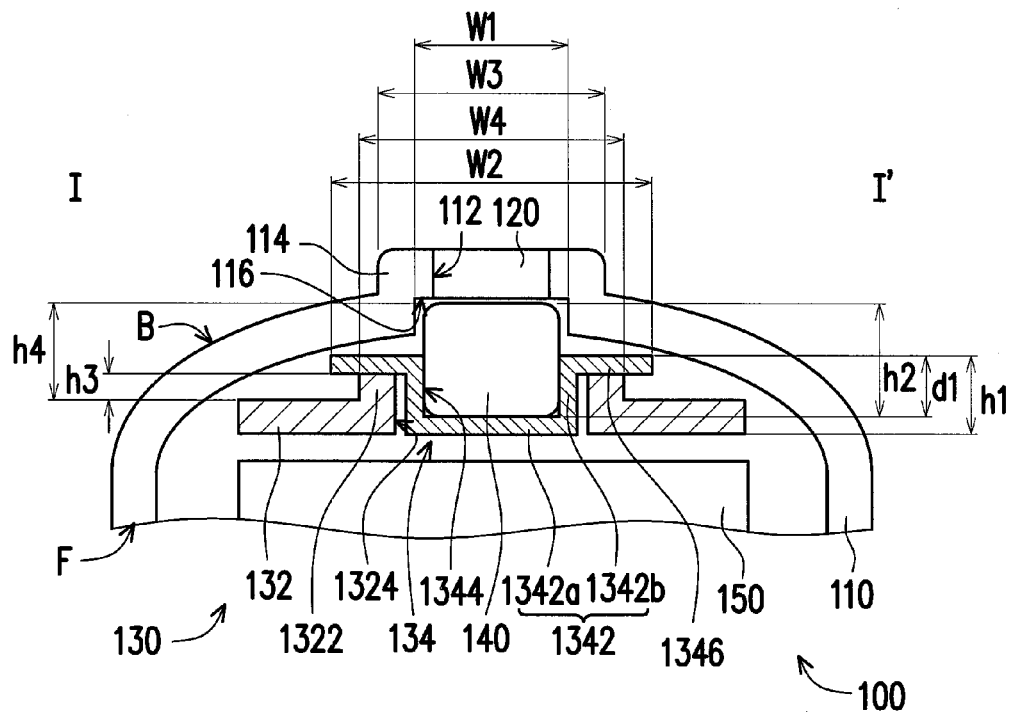
FIG. 2 is a schematic cross-sectional view along line I-I' of FIG. 1.

FIG. 1 is a schematic view of an electronic device according to an embodiment of the present invention. FIG. 2 is a schematic cross-sectional view along line I-I' of FIG. 1. The electronic device 100 illustrated in FIG. 1 is exemplified as a smart phone. However, in other embodiments not illustrated, the electronic device can also be a tablet computer, a notebook computer, or other suitable electronic devices. The present application does not limit the type of the electronic device. Referring to FIG. 1 and FIG. 2, in the present embodiment, the electronic device 100 includes a housing 110, a transparent cover 120, a support member 130, and a camera module 140. The housing 110 of the electronic device 100 has an opening 112, and the transparent cover 120 is disposed on the opening 112. Moreover, the support member 130, the camera module 140, and other body and internal parts not shown of the electronic device 100 are disposed inside the housing 110. In particular, the support member 130 is used to bear the camera module 140, and the location of the camera module 140 corresponds to the location of each of the opening 112 and the transparent cover 120. More specifically, the opening 112 and the transparent cover 120 of the present embodiment are disposed on the housing 110 and correspond to a back B (such as the back cover) of the electronic device 100. In particular, the opening 112 passes through the housing 110, and the transparent cover 120 is, for instance, a glass cover. The width of the opening 112 is substantially equal to the width of the camera module 140. However, in other embodiments, the width of the opening can be greater than the width of the camera module; the present application is not limited thereto. In this way, the camera module 140 disposed inside the housing 110 can capture an image outside the electronic device 100 through the opening 112 and the transparent cover 120.

In the present embodiment, the housing 110 has a bump 114. The bump 114 extends toward the outside of the electronic device 100, and correspondingly forms a recess 116 on the inside of the housing 110. In other words, the bump 114 and the recess 116 can be formed by a portion of the housing 110 protruding outwardly. The opening 112 is located on the bump 114 and is connected to the recess 116 so as to pass through the housing 110. The camera module 140 faces the recess 116. The support member 130 is disposed inside the housing 110. In particular, the support member 130 includes a chassis 132 and a holder 134. The chassis 132 is disposed inside the housing 110. The holder 134 is disposed on the chassis 132, and the camera module 140 is disposed on the holder 134 and faces the opening 112. Accordingly, the camera module 140 is disposed inside the housing 110 through the support member 130. Moreover, in the present embodiment, the electronic device 100 further includes a liquid crystal display module 150 (shown in FIG. 2). The liquid crystal display module 150 is disposed inside the housing 110 and located on one side of the chassis 132 relative to the opening 112. In other words, the liquid crystal display module 150 is located on a front F of the electronic device 100. In this way, a user can capture an image through the camera module 140 corresponding to the back B of the electronic device 100, and view the image from the front F of the electronic device 100 through the liquid crystal display module 150. However, in an embodiment not illustrated, the camera module 140 and the opening 112 and the transparent cover 120 located on the housing 110 can also correspond to the front F of the electronic device 100 and be located on one side of the liquid crystal display module 150. The present application does not limit the location of the camera module 150.

Referring to FIG. 2, in the present embodiment, the holder 134 includes a body 1342, an accommodation recess 1344, and a skirt 1346. The accommodation recess 1344 is located on the body 1342 and faces the recess 116 of the housing 110. The skirt 1346 extends toward the outside of the accommodation recess 1344 from a side of the accommodation recess 1344 and surrounds the body 1342. Although the skirt 1346 in FIG. 2 is illustrated to be located on two opposite sides of the accommodation recess 1344, in actuality, the skirt 1346 can be a ring structure surrounding the accommodation recess 1344 that is rendered to be located on the left and right sides of the accommodation recess 1344 and extending outwardly in the cross section. However, in other embodiments, the skirt 1346 can also be two protruding structures disposed on two opposite sides of the accommodation recess 1344. The present application does not limit the actual structure of the skirt 1346. Moreover, the body 1342 of the present embodiment includes a bottom wall 1342a and a plurality of sidewalls 1342b. The bottom wall 1342a is parallel to the chassis 132. The sidewalls 1342b extend toward the housing 110 from a side of the bottom wall 1342a and surround the bottom wall 1342a. Moreover, the sidewalls 1342b are substantially perpendicular to the bottom wall 1342a to form the accommodation recess 1344. The skirt 1346 of the holder 134 is parallel to the chassis 132 and extends outwardly from an end of the sidewalls 1342b away from the bottom wall 1342a. However, in other embodiments not illustrated, the skirt 1346 can also extend outwardly from the middle of the sidewalls 1342b; the present application is not limited thereto. Moreover, the camera module 140 is disposed inside the accommodation recess 1344, a portion of the camera module 140 protrudes outside the accommodation recess 1344, and the portion of the camera module 140 protruding outside the accommodation recess 1344 is located inside the recess 116 and corresponds to the transparent cover 120, so as to capture an image through the opening 112 and the transparent cover 120. Furthermore, the support member 130 including the chassis 132 and the holder 134 are all located outside the recess 116, such that the sidewalls 1342b of the recess 116 face and surround the camera module 140.

Specifically, in the present embodiment, a height h1 of the holder 134 bearing the camera module 140 is less than a height h2 of the camera module 140, and a depth d1 of the accommodation recess 1344 is less than the height h2 of the camera module 140. That is, the height of each of the sidewalls 1342b of the body 1342 relative to the bottom wall 1342a (comparable to the depth d1 of the accommodation recess 1344 in the present embodiment) is less than the height of the camera module 140 relative to the bottom wall 1342a (comparable to the height h2 of the camera module 140 itself in the present embodiment), such that a portion of the camera module 140 disposed inside the accommodation recess 1344 protrudes outside the accommodation recess 1344. Accordingly, in the present embodiment, the bump 114 only needs to wrap the portion of the camera module 140 protruding outside the accommodation recess 1344 through the recess 116. Since the electronic device 100 adopts the design of the bump 114, a portion of the camera module 140 is housed in the recess 116 corresponding to the bump 114. Therefore, the thickness of each of the other regions of the electronic device 100 can be reduced without being limited to the dimension of the camera module 140.

Since the support member 130 of the present embodiment is located outside the recess 116, no additional frames are present between the sidewalls of the recess 116 and the camera module 140. Therefore, a width W1 of the recess 116 can be slightly greater than the width of the camera module 140 to reduce a width W3 of the bump 114 and improve the aesthetics of the exterior design of the electronic device 100. More specifically, in the present embodiment, the height of the support member 130 bearing the camera module 140 is reduced such that a portion of the camera module 140 is exposed to the outside of the accommodation recess 1344, the width W1 of the recess 116 is configured to be less than the width W2 of the holder 134, only the portion of the camera module 140 protruding outside the accommodation recess 1344 is located inside the recess 116, and the holder 134 is located outside the recess 116 due to the dimension of the holder 134. In this way, the housing 110 adjacent to the bump 114 can be closer to the camera module 140, thereby reducing the dimension of the bump 114.

Moreover, in the present embodiment, the chassis 132 has a rib 1322 extending toward the housing 110 and a hole 1324. The hole 1324 is located on the rib 1322 and passes through the rib 1322. The holder 134 is supported against the rib 1322 of the chassis 132 through the skirt 1346, and the body 1342 is located inside the hole 1324. Although the rib 1322 of FIG. 2 is illustrated to be located on two opposite sides of the hole 1324, in actuality, the rib 1322 can be a protrusion protruding beyond the chassis 132 and the hole 1324 can pass through the rib 1322, such that the rib 1322 forms a ring structure surrounding the hole 1324 and is rendered as being disposed on the left and right in the cross section. However, in other embodiments not illustrated, the rib 1322 can also be two protruding structures disposed on two opposite sides of the hole 1324 and corresponding to the skirt 1346. Alternately, the chassis 132 can also be only disposed on the hole 1324 such that the holder 134 is supported against an edge of the hole 1324 through the skirt 1346. The present application does not limit the actual structure and the inclusion of the rib 1322. In this way, since the holder 134 is supported against the rib 1322 through the skirt 1346 and disposed on the chassis 132, a height h3 of the rib 1322 relative to the chassis 132 is also less than a height h4 of the camera module 140 relative to the chassis 132, such that the camera module 140 protruding beyond the accommodation recess 1344 also protrudes beyond the rib 1322. Moreover, in the present embodiment, the width W1 of the recess 116 of the housing 110 can also be configured to be less than the width W4 of the rib 1322 of the chassis 132. In this way, the rib 1322 of the chassis 132 cannot be extended into the recess 116 to make the chassis 132 be located outside the recess 116. That is, only the portion of the camera module 140 protruding outside the accommodation recess 1344 and higher than the rib 1322 is located inside the recess 116. In other words, the height of the support member 130 including the chassis 132 and the holder 134 is less than the camera module 140, such that the housing 110 in the periphery of the bump 114 can be closer to the camera module 140. Accordingly, the width W3 of the bump 114 is reduced by reducing the width W1 of the recess 116.

Based on the above, the electronic device of the present application has a camera module located inside a housing, and the camera module is disposed inside an accommodation recess of a support member. In particular, the outside of the housing has a bump corresponding to the camera module, the bump correspondingly forms a recess on the inside of the housing, a portion of the camera module protrudes outside the accommodation recess and is located inside the recess, and the support member is located outside the recess, such that a sidewall of the recess faces and surrounds the camera module. In other words, the recess corresponding to the bump only wraps a portion of the camera module and does not wrap the support member used for bearing the camera module. In this way, the width of the recess can be configured to be less than the width of the holder and the width of the rib of the chassis such that the support member including the chassis and the holder are all located outside the recess. Accordingly, in the present application, the height of the support member is designed to be less than the camera module, such that the housing adjacent to the bump can be closer to the camera module, thereby reducing the dimension of the bump. Since the electronic device of the present application adopts the design of a bump, the thickness of each of the other regions of the electronic device can be reduced without being limited to the dimension of the camera module.

Although the present application has been described with reference to the above embodiments, it will be apparent to one of the ordinary skill in the art that modifications and variations to the described embodiments may be made without departing from the spirit and scope of the present application. Accordingly, the scope of the present application will be defined by the attached claims not by the above detailed descriptions.

What is claimed is:

1. An electronic device, comprising:
a housing having a bump and an opening, wherein the bump extends toward an outside of the electronic device, correspondingly forms a recess on an inside of the housing, and the opening is located on the bump and connected to the recess;
a transparent cover disposed on the opening;
a support member disposed inside the housing, wherein the support member comprises:
a chassis disposed inside the housing; and
a holder comprising a body, an accommodation recess, and a skirt, wherein the accommodation recess is located on the body and faces the recess, the skirt extends toward an outside of the accommodation recess from a side of the accommodation recess, and the holder is supported against the chassis through the skirt; and
a camera module disposed inside the accommodation recess, wherein a portion of the camera module protrudes outside the accommodation recess, the portion of the camera module protruding outside the accommodation recess is located inside the recess and corresponds to the transparent cover, and the support member is located outside the recess, such that a sidewall of the recess faces and surrounds the camera module.

2. The electronic device of claim 1, wherein a depth of the accommodation recess is less than a height of the camera module.

3. The electronic device of claim 1, wherein the chassis has a rib extending toward the housing and a hole, the hole is located on the rib and passes through the rib, the holder is supported against the rib through the skirt, and the body is located inside the hole.

4. The electronic device of claim 3, wherein a height of the rib relative to the chassis is less than a height of the camera module relative to the chassis.

5. The electronic device of claim 3, wherein a width of the recess of the housing is less than a width of the rib of the chassis.

6. The electronic device of claim 1, wherein a width of the recess of the housing is less than a width of the holder.

7. The electronic device of claim 1, wherein the body comprises a bottom wall and a plurality of sidewalls, the bottom wall is parallel to the chassis, the sidewalls extend toward the housing from a side of the bottom wall and surround the bottom wall to form the accommodation recess.

8. The electronic device of claim 7, wherein a height of each of the sidewalls relative to the bottom wall is less than a height of the camera module relative to the bottom wall.

9. The electronic device of claim 1, wherein a width of the opening is substantially equal to a width of the camera module.

10. The electronic device of claim 1, further comprising:
a liquid crystal display module disposed inside the housing and located on one side of the chassis relative to the opening.

* * * * *